(12) United States Patent
Rolland et al.

(10) Patent No.: US 8,333,903 B2
(45) Date of Patent: Dec. 18, 2012

(54) PHASE CHANGE MATERIAL (PCM) COMPOSITIONS FOR THERMAL MANAGEMENT

(75) Inventors: Loic Pierre Rolland, Divonne les Bains (FR); Raymond Joseph Reisdorf, Attert (BE)

(73) Assignees: E I du Pont de Nemours and Company, Wilmington, DE (US); Dupont de Nemours (Luxembourg) SARL

( * ) Notice: Subject to any disclaimer, the term of this patent is extended or adjusted under 35 U.S.C. 154(b) by 0 days.

(21) Appl. No.: 13/164,239

(22) Filed: Jun. 20, 2011

(65) Prior Publication Data

US 2011/0248208 A1 Oct. 13, 2011

Related U.S. Application Data

(63) Continuation of application No. 11/285,779, filed on Oct. 26, 2005, now abandoned.

(60) Provisional application No. 60/634,592, filed on Dec. 9, 2004.

(51) Int. Cl.
| | | |
|---|---|---|
| C09K 3/18 | (2006.01) | |
| C08J 3/22 | (2006.01) | |
| C08K 5/01 | (2006.01) | |
| C08L 91/08 | (2006.01) | |
| C08L 9/00 | (2006.01) | |
| B60C 1/00 | (2006.01) | |

(52) U.S. Cl. .................... 252/70; 524/487; 524/573
(58) Field of Classification Search .......... 524/100, 524/277, 385, 487, 573; 252/70
See application file for complete search history.

(56) References Cited

U.S. PATENT DOCUMENTS

| | | | |
|---|---|---|---|
| 4,528,329 A | 7/1985 | Inoue et al. | |
| 4,825,939 A | 5/1989 | Salyer et al. | |
| 4,843,125 A * | 6/1989 | Kawamura et al. | ............ 525/98 |
| 4,908,166 A | 3/1990 | Salyer | |
| 5,053,446 A | 10/1991 | Salyer | |
| RE34,880 E | 3/1995 | Salyer | |
| 5,414,044 A * | 5/1995 | Moriya et al. | ................... 525/74 |
| 5,718,835 A * | 2/1998 | Momose et al. | ................ 252/73 |
| 6,225,412 B1 * | 5/2001 | Chaffin et al. | ................ 525/240 |

FOREIGN PATENT DOCUMENTS

| | | |
|---|---|---|
| CN | 1587340 A | 3/2005 |
| DE | 19929861 A1 | 1/2001 |
| EP | 0412021 A1 | 2/1991 |
| EP | 2105460 A1 * | 9/2009 |
| JP | 01278647 A | 11/1989 |
| JP | 4072380 A | 3/1992 |
| JP | 4085387 A | 3/1992 |
| JP | 05078653 A | 3/1993 |
| WO | 2004/044345 A2 | 5/2004 |

OTHER PUBLICATIONS

Rubber Technology, edited by John S. Dick, 2001.*
Xiao M et al, "Preparation and performance of shape stabilized phase change thermal storage materials with high thermal conductivity", Energy Conversion and Management, Elsevier Science Publishers, Oxford, GB, vol. 43, No. 1, Jan. 2002, pp. 103-108.
http://techcenter.lanxess.com/trp/emea/en/products/description/8/index.jsp?pid=8.

* cited by examiner

Primary Examiner — Mark Eashoo
Assistant Examiner — Angela C Scott

(57) ABSTRACT

The present invention relates to a Phase Change Material (PCM) composition comprising a) from 20 to 80 wt % of a PCM; and b) from 20 to 80 wt % of one or more polymers chosen from the group consisting of b1) Very Low Density Polyethylene (VLDPE) having a density equal or lower than 0.910 g/cm$^3$ measured according to ASTM 792; b2) Ethylene Propylene Rubber (EPR) having a density equal or lower than 0.900 g/cm$^3$ measured according to ASTM 792; b3) Styrene Ethylene Butadiene Styrene (SEBS) copolymers; and b4) Styrene Butadiene Styrene (SBS) copolymers. The PCM composition of the present invention can be used in applications where thermal management is needed, like for example in building, automotive, packaging, garments and footwear.

13 Claims, 1 Drawing Sheet

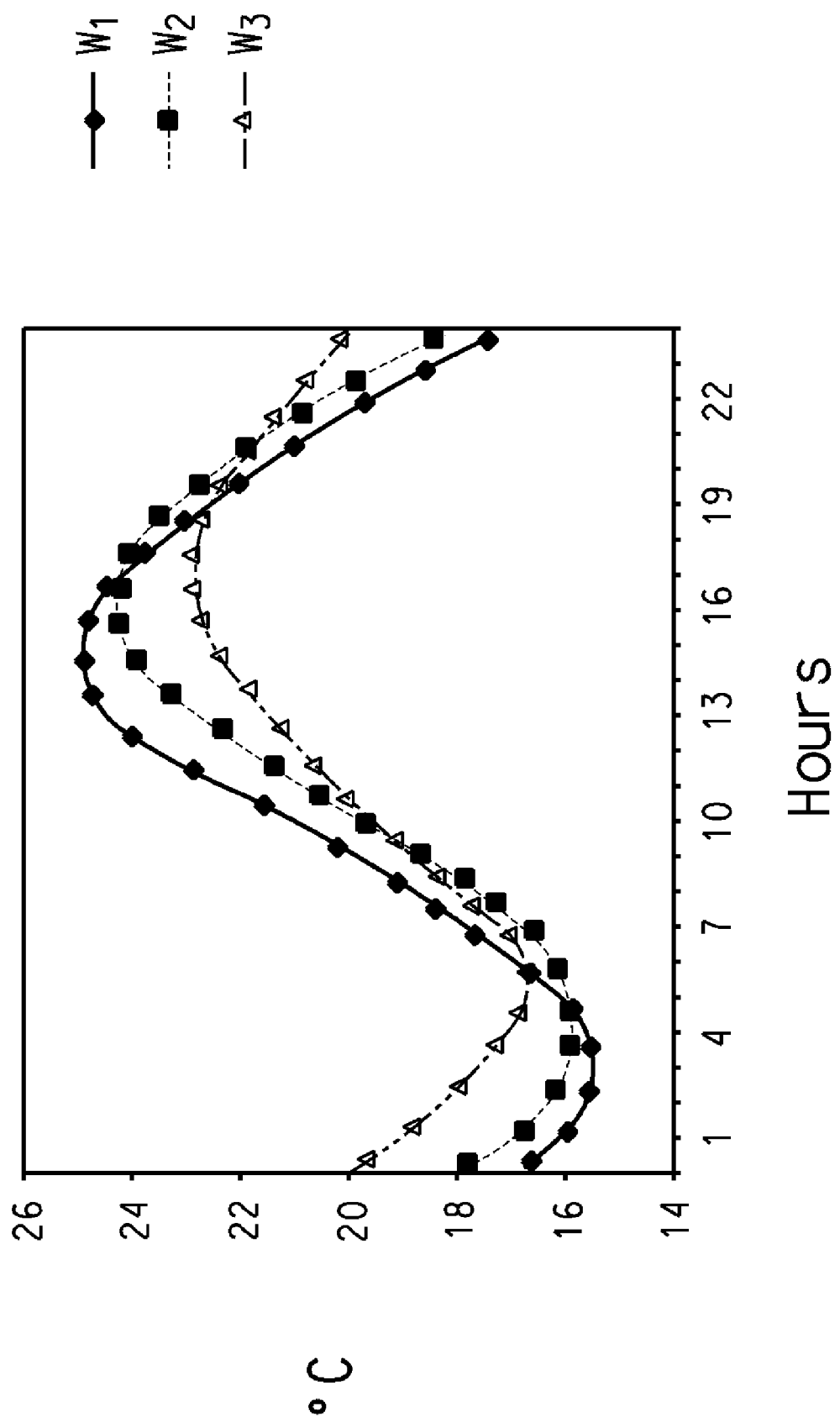

PHASE CHANGE MATERIAL (PCM) COMPOSITIONS FOR THERMAL MANAGEMENT

CROSS REFERENCE TO RELATED APPLICATION

This application is a continuation of pending U.S. application Ser. No. 11/258,779 filed Oct. 26, 2005, which claims the benefit of U.S. Provisional Application No. 60/634,592, filed Dec. 9, 2004.

FIELD OF INVENTION

The present invention relates to Phase Change Material (PCM) compositions for the thermal management in different applications like for example in building, automotive, packaging, garments and footwear. The present invention also relates to sheets and molded parts comprising the above PCM composition.

BACKGROUND OF THE INVENTION

There is a general desire in all technical fields to be energy efficient. In the building industry, for example, there is a permanent need to decrease the energy costs related to heating and cooling indoor rooms. The same applies also in the textile industry, for instance for life and personal protection clothing, where the heat excess produced by the wearer must be removed and managed away from his body in order to increase the overall wear comfort.

PCM materials are highly-productive thermal storage media which are capable of absorbing and releasing high amounts of latent heat during melting and crystallization, respectively. During such phase changes, the temperature of the PCM materials remains nearly constant and so does the space surrounding the PCMs, the heat flowing through the PCM being "entrapped" within the PCM itself. Paraffin waxes are known to be particularly efficient as PCMs.

FIG. 1 shows a temperature profile simulation of the inside surface of three building wall structures (wood timber frames) during a typical summer day (latitude 45°; azimuth 180°; air $T_{min}$ 15° C.; air $T_{max}$ 35° C.). Such three wall structures comprise an external layer (wood siding, thickness 20 mm), a stone wool layer (thickness 250 mm) adjacent to such external layer and an internal gypsum board (thickness 10 mm). The first wall structure (W1) does not include PCM, while the second and third wall structures (W2,W3) further comprise a PCM composition layer positioned between the stone wool layer and the gypsum board layer, the PCM composition layers consisting of 7.15 wt % of PCM and 92.85 wt % of an hypothetical polymer and 45 wt % of PCM and 55 wt % of an hypothetical polymer, respectively. The PCM considered for this simulation is commercially available from Rubitherm under the trade name Rubitherm® RT20 (melting point 22° C.).

FIG. 1 shows that the variation of the inside wall temperature during the day is reduced with increasing PCM amount in the wall structure or, in other words, that the heat management performance of the wall structure increases with increasing amount of PCM included therein.

WO 2004/044345 discloses a wall covering assembly comprising phase change materials like crystalline alkyl hydrocarbons as a thermal storage mean. The assembly comprises 1) a cover layer of fabric or paper covered by a vinyl coating; 2) an intermediate layer made of an acrylic coating compound which contains finely divided PCM and a rear layer made of a liquid ceramic compound facing the wall during use. However, the capacity of the acrylic coating to incorporate PCM is limited due to the polarity and the elevated crystallinity degree of the acrylic material itself, so that the heat storage capacity of the overall assembly is limited to a certain extent.

U.S. Pat. No. 5,053,446 discloses a composite useful in thermal energy storage, said composite being a polyolefin matrix having a PCM (for example a crystalline alkyl hydrocarbon) incorporated therein. The polyolefin matrix is crystalline and must be thermally form stable up to temperatures of 150-180° C. This is due to the fact that the PCM imbibition of the matrix must take place at temperatures up to the above values in order to enable the PCM material itself to penetrate into the narrow spaces of the crystalline matrix. The thermal stability is usually achieved by reticulating the polyolefin prior to the imbibition process. This is an additional step for the preparation of the composite material, which additional step renders the overall manufacturing process more complicated and expensive. Furthermore, because of the limited space available within the matrix itself, proper retention of the PCM, particularly at temperatures below the PCM melting point, is very difficult, thus leading to a strong decrease in the heat management performance of the overall composite.

The problem at the root of the present invention is therefore to provide a PCM composition for the thermal management in different applications like for example in building, automotive, garments and footwear, which PCM composition can overcome the problems mentioned above.

SUMMARY OF THE INVENTION

Now, it has been surprisingly found that the above-mentioned problems can be overcome by a PCM composition comprising:
  a) from 20 to 80 wt % of a PCM; and
  b) from 20 to 80 wt % of one or more polymers chosen from the group consisting of:
    b1) Very Low Density Polyethylene (VLDPE) having a density equal or lower than 0.910 g/cm³ measured according to ASTM 792;
    b2) Ethylene Propylene Rubber (EPR) having a density equal or lower than 0.900 g/cm³ measured according to ASTM 792;
    b3) Styrene Ethylene Butadiene Styrene (SEBS) copolymers; and
    b4) Styrene Butadiene Styrene (SBS) copolymers;
the weight percentages being based on the total weight of the composition.

It is another aspect of the present invention to provide a sheet made with the PCM composition described above, as well as a multilayer structure including said sheet.

It is a further aspect of the present invention to provide a molded part made of the PCM composition described above.

BRIEF DESCRIPTION OF THE DRAWING

FIG. 1 is a temperature profile simulation of the inside surface of three building wall structures (wood timber frames) during a typical summer day (latitude 45°; azimuth 180°; air $T_{min}$ 15° C.; air $T_{max}$ 35° C.).

DETAILED DESCRIPTION OF THE INVENTION

The polymers used in the present invention have low polarity and crystallinity. The low polarity degree of the polymer is important to enable compatibility between the polymer itself and a PCM of non-polar nature. Moreover, due to their amorphousness, the polymer matrices used in the present invention have sufficient absorption capacity to incorporate and retain high amounts of PCM, even at temperatures which are above or below the melting point of the PCM itself. The capacity of the above polymers to efficiently retain the PCM within their own matrix confers to the composition of the present invention an excellent heat management performance over long periods of time.

The density of polymers is directly correlated to the percentage of crystallinity by the following equation (D. Campbell and J. R. White, *Polymer Characterization*, Chapman and Hall, 1989, page 328):

% crystallinity=$\rho_s-\rho_a/\rho_c-\rho_a$ where $\rho_s$ is the density of a given polymer, $\rho_a$ is the density of the same polymer having an amorphous structure and $\rho_c$ is the density of the same polymer having 100% crystalline structure.

For the purpose of the present invention, the one or more polymers can be chosen among all types of SEBSs and SBSs copolymers which are well known to be amorphous and which typically have densities varying between 0.900 and 1.1 g/cm³. It is also possible to use EPR copolymers having densities equal or lower than 0.900 g/cm³ as well as VLDPEs having densities equal or lower than 0.910 g/cm³, preferably between 0.800 and 0.910, all densities being measured according to ASTM 792.

According to a preferred embodiment of the present invention, the PCM composition includes EPRs which are chosen among Ethylene Propylene Diene Methylene (EPDM), Ethylene Propylene Methylene (EPM) and mixtures thereof. Alternatively, the sole polymer used in the PCM composition of the present invention is VLDPE having a density equal or lower than 0.910 g/cm³.

Advantageously, the PCM composition of the present invention comprises from 30 to 50 wt % and still more preferably about 40 wt % of the one or more polymers, the weight percentages being based on the total weight of the PCM composition.

In accordance with a preferred embodiment of the invention, the PCM is chosen among one or more alkyl hydrocarbons (paraffin waxes). Paraffin waxes are saturated hydrocarbon mixtures and generally consist of a mixture of mostly straight-chain n-alkanes with the chemical formula $CH_3$—$(CH_2)_n$—$CH_3$. The crystallization of the —$(CH_2)_n$— chain releases a large amount of the latent heat. Both the melting point and the heat of fusion increase with increasing chain length. Therefore, it is possible to select the paraffin waxes, which are products of petroleum refining, in such a way that the phase change temperature range matches with the temperature of the operation system to which the PCM is applied.

The thermal properties of three different paraffin waxes are given in Table 1.

TABLE 1

| Alkane | No. of C | Melt. Point ° C. | Heat of Fusion KJ/kg | Spec. Heat $C_p$kJ/kg ° C. | State at RT |
|---|---|---|---|---|---|
| Tetradecane | 14 | 5.8 | 227 | 2.18 | liquid |
| Pentadecane | 15 | 9.9 | 206 | | liquid |
| Hexadecane | 16 | 18.1 | 236 | 2.22 | solid |

Preferably, the PCM composition of the present invention includes from 50 to 70 wt % of PCM, preferably 60 wt %, the weight percentages being based on the total weight of the PCM composition.

According to another embodiment, the PCM composition of the present invention further comprises from 10 to 40 wt % of an inert powder having an absorption capacity of at least 50 wt % and preferably of at least 120 wt %, the weight percentages being based on the dried mass of the inert powder itself. The use of the inert powder further improves retention of the PCM within the polymeric matrix. Advantageously, the inert powder used in the PCM composition of the present invention is silicate, one or more flame retardant fillers and mixtures thereof. The one or more flame retardant fillers are advantageously chosen among aluminum trihydrate, magnesium hydroxide, melamine pyrophosphate, melamine cyanurate, one or more brominated fillers and mixtures thereof.

In another aspect of the present invention, the one or more polymers of the PCM composition are grafted with 0.2 to 3 wt % of a carboxylic acid or carboxylic acid anhydride functionality, the weight percentages being based on the total weight of the one or more polymers. While this small quantity of carboxylic acid or carboxylic acid anhydride does not affect the overall polarity of the polymer matrix, it is desirable to have such functionality in such amount if the PCM composition is used in combination with, for example, aluminum foils since the carboxylic acid or carboxylic acid anhydride functionality strongly improves adhesion of the PCM composition to metal surfaces.

The polymer matrix of the PCM composition according to the present invention may be cross-linked after the PCM has been incorporated into it by means of any conventional method known in the art like for example by using cross-linking agents based on silane and/or peroxide groups. During this process, it is important to avoid that cross-linking of the PCM takes place. This is possible, for example, by grafting silane groups onto the polymer molecules prior to incorporating the PCM. Such grafting can occur by means of conventional techniques, such as by extruding the polymer at temperatures above 150° C. after adding 0.2 to 2 wt-% of vinyl-tri-methoxy-silane or vinyl-tri-ethoxy-silane together with 0.05 to 0.5 wt-% peroxide. The PCM can then be incorporated into the silane grafted polymer and the resulting blend can be cross-linked, in presence of water or water moisture, by using catalysts like di-butyl-tin-laureate. Such cross-linking of the polymer matrix enables to increase the mechanical and thermal properties of the composition itself when used in the different applications listed below.

The PCM composition of the invention may further comprise conventional additives such as antioxidants and UV filters. These additives may be present in the composition in amounts and in forms well known in the art.

The PCM composition according to the present invention can be produced by soaking the different components all together at temperatures which are slightly above the melting point of the PCM but below the melting point of the one or more polymers. Soaking is a natural absorption of the molten PCM by the polymer matrix. Usually the components are mixed together in a tumble blender during a certain period of time which can vary in function of the rotational speed of the tumble blender itself. Typical periods of time are around eight (8) hours.

Another possibility for obtaining the PCM composition of the present invention is by melt blend extrusion whereby the components are blended at temperatures above the melting point of both the one or more polymers and the PCM, the thus obtained mixture being subsequently extruded into granules or directly into sheets or any other suitable form.

Sheets made with the PCM composition described above are also an object of the present invention. Preferably such sheets have a thickness varying between 0.5 and 10 mm and can be manufactured either directly by melt blend extrusion as described above, or alternatively by preparing the PCM composition which is subsequently processed by means of any conventional technology such as extrusion, calendering and hot lamination.

Another object of the present invention is a multilayer structure comprising at least one sheet (A) of the above PCM composition, which is adjacent to at least one layer (B). Preferably, such sheet (A) is positioned between two layers (B1,B2). One of the functions of the at least one layer (B), or preferably of two layers (B1,B2) is to help keep the PCM material of the sheet (A) within the polymer matrix, thus enabling to maintain the heat management performance of the PCM sheet (A) at a high level over a long period of time. Furthermore, undesired grease stains on the surfaces adjacent to the PCM composition are hereby avoided.

According to one embodiment of the present invention, the multilayer structure comprises in the following sequence:
a) at least one sheet (A);
b) at least one layer (B) positioned adjacent to the at least one sheet (A);
c) one or more additional layers (C) positioned adjacent to the at least one layer (B).

According to another embodiment of the present invention, the multilayer structure further comprises one or more additional layers (C) positioned adjacent and externally to one or more of the layers (B1, B2).

The at least one layer (B) and the one or more additional layers (C) can also have the function of conferring to the overall multilayer structure improved fire retardancy and heat conductivity so that heat is easily conveyed through such at least one layer to the PCM composition and vice versa.

The at least one layer (B) and the one or more additional layers (C) can be made of aluminum. It is also possible to use polyester vacuum coated on one side with aluminum, the aluminated side facing the PCM sheet (A), in order to achieve optimum adhesion. The use of aluminated polyester also confers to the overall PCM multilayer structure an excellent mechanical strength as well as an excellent elasticity.

The at least one layer (B) and the one or more additional layers (C) can be made of other materials instead of (or in addition to) the above mentioned aluminum and/or polyester vacuum coated material, according to the specific use and application. Such materials can be independently chosen from one or more of flame retardant polymer compositions (polymers filled with flame retardant inorganic fillers like aluminum trihydrate, magnesium hydroxide, calcium carbonate, brominated fillers and melamine pyrophosphate), plaster (plaster boards and panels, gypsum boards), rockwool insulation, glass-wool insulation, foamed polystyrene and other materials conventionally used in the construction industry.

The at least one layer (B) and the one or more additional layers (C) may have a thickness varying from 5 µm up to 20 cm in accordance with the materials used. Aluminum layers, for example, will have thicknesses typically varying from 5 to 500 µm, preferably from 20 to 80 µm and, still more preferably, of about 50 µm.

The multilayer structure of the present invention can be manufactured by conventional methods. This includes extrusion coating the PCM material onto the at least one layer (B), extrusion laminating the PCM material between two of such layers (B1, B2), and co-extruding the PCM material with the at least one layer (B) if the material of such at least one layer (B) makes it possible (for example if the at least one layer is made of a flame retardant composition).

An additional aspect of the present invention relates to a molded part made of a PCM composition as described above. Such molded part can be manufactured by any process suitable for transforming thermoplastic materials including injection molding, blow molding, thermoforming and roto-molding.

The PCM composition of the present invention can be used in several applications where thermal management is needed. While temperature management inside buildings is one of the most relevant applications, the PCM composition of the present invention may also be used in automotive applications (for example in the ceiling, seats and tires of vehicles); air filters in air ducts; transportation applications; food packaging (to keep food chilled or warm); medical packaging; woven and nonwoven fabrics for garments and sport wear; footwear; tree wraps, hand grips (in tools, sporting goods and vehicles); bedding; carpets; wood composites; electric cables and plastic tubes for hot media including water.

The invention will be further described in the following Examples.

EXAMPLES

Example 1

55 g of paraffinic wax (PCM) commercially available from Rubitherm under the trade name Rubitherm® RT20 (melting point 22° C.) and 45 g of granules of VLDPE (density 0.863 g/cm$^3$) grafted with 0.5 wt % of maleic anhydride, commercially available from E. I. du Pont de Nemours and Company under the trade name Fusabond® 493 D, were simultaneously introduced into an one liter tumble blender. Blending was carried out during eight (8) hours at 25° C. in order to enable sufficient time for maximal incorporation of the liquid paraffinic wax into the polymer matrix (soaking). The granules soaked with the paraffinic wax were taken out of the blender and filtered in order to remove rests of liquid paraffin wax from their external surface. The difference in the granules weight before and after soaking was measured, thus allowing to calculate the weight percentage of wax absorbed by the polymer matrix.

Slabs were compression molded using the PCM composition obtained above. The granules were placed in a frame (thickness of 2 mm) between 2 steel slabs and the whole system was subsequently pressed at a jaw temperature of 100° C. and at a pressure of 1 bar during the first minute and of 80 bars during the subsequent 2 minutes. The jaws were then cooled down to 25° C. during a period of 4 minutes always under a pressure of 80 bars. The pressure was eventually released and the produced polymer slabs removed from the frame.

The flexibility of the molded slabs was tested. Tensile strength and elongation at break were also measured on dumble bar samples cut out from two of these slabs, according to method DIN 53504 S2.

The results are shown in Table 2.

Example 2

Comparative

Example 1 was repeated using granules of ethylene methyl acrylate, comprising 25 wt % of methyl acrylate, commercially available from E. I. du Pont de Nemours and Company under the trade name Elvaloy® AC 1125. No slabs were made with the PCM composition obtained under this Example 2.

The results are shown in Table 2.

Example 3

Example 1 was repeated using granules of VLDPE (density 0.863 g/cm³), commercially available from Dow Chemicals under the trade name Engage® 8180. No slabs were made with the PCM composition obtained under this Example 3.

The results are shown in Table 2.

Example 4

Comparative

Example 1 was repeated using granules of HDPE (density 0.965 g/cm³), commercially available from E. I. du Pont de Nemours and Company under the name DuPont™ 6611. No slabs were made with the PCM composition obtained under this Example 4.

The results are shown in Table 2.

Example 5

Comparative

Example 1 was repeated using granules of HDPE (density 0.965 g/cm³), commercially available from E. I. du Pont de Nemours and Company under the name DuPont™ 6611. Blending was carried out during eight (8) hours at 180° C.

The results are shown in Table 2.

TABLE 2

|  | Example 1 | Example 2 | Example 3 | Example 4 | Example 5 |
|---|---|---|---|---|---|
| Soaking Temp. (° C.) | 25 | 25 | 25 | 25 | 180 |
| Weight %[1] | 100 | 23 | 100 | 13 | 100 |
| Flexibility of the molded slabs | very flexible |  | very flexible |  | very brittle |
| Tensile strength (Mpa) | >4.6[2] |  |  |  | 2.1 |
| Elongation at break (%) | >2293[2] |  |  |  | 5.9 |

[1]Weight percentage of paraffin wax absorbed by the polymer matrix after eight (8) hours soaking. 100% means total absorption, that is 55 g of paraffin wax absorbed into 45 g of polymer.
[2]2293% (4.6 Mpa) is the maximal value measurable with the testing equipment.

Table 2 shows that the polymer matrices according to the present invention (Examples 1 and 3) can absorb the whole amount of PCM (55 g PCM per 45 g polymer) at 25° C. while polymers having high degrees of polarity (Example 2) or high degrees of crystallinity (Example 4) can absorb PCM only to a limited extent. In order to achieve full absorption of the PCM with high crystallinity HDPE matrices, it is necessary to increase the soaking temperature up to 180° C. (Example 5). Slabs obtained by molding the PCM compositions according to the present invention are very flexible and show excellent mechanical properties. On the other hand, Example 5 shows that slabs prepared with PCM compositions based on crystalline polymers (HDPE) are very brittle. Therefore, from a mechanical point of view, such compositions are not suitable in the thermal management applications described above even if their PCM content is quite high.

Example 6

44.6 g of granules of VLDPE (density 0.863 g/cm³), commercially available from Dow Chemical under the trade name Engage® 8180, were extruded, at a temperature of 220° C., with 0.4 g of a mix of vinyl-tri-methoxy-silane and peroxide catalyst (XL-Pearl® 23 commercially available from General Electric, Osi Specialities) so to obtain a blend. 55 g of paraffinic wax (PCM) commercially available from Rubitherm under the trade name Rubitherm® RT20 (melting point 22° C.), 0.03 g of di-butyl-tin-laureate and 45 g of the VLDPE based blend obtained above, were simultaneously introduced into an one liter tumble blender. Blending was carried out during eight (8) hours at 25° C. in order to enable sufficient time for maximal incorporation of the liquid paraffinic wax and di-butyl-tin-laureate into the polymer matrix (soaking). The granules soaked with the paraffinic wax and di-butyl-tin-laureate were taken out of the blender.

Slabs were compression molded using the PCM composition obtained in this Example 6 as well as the one obtained in Example 3. The granules were placed in a frame (thickness of 2 mm) between 2 steel plates and the whole system was subsequently pressed at a jaw temperature of 150° C. and at a pressure of 1 bar during the first minute and of 80 bars during the subsequent 2 minutes. The jaws were then cooled down to 25° C. during a period of 4 minutes always under a pressure of 80 bars. The pressure was eventually released and the produced polymer slabs removed from the frame. The slabs were then immerged in water during 4 hours and dumble bar samples were cut out from these slabs, according to method DIN 53504 S2.

A weight of 52 g was hanged to each of the dumble bars which were fixed inside an oven. Tests were performed at different temperatures and during a period of 15 minutes. The temperature at which each sample broke was recorded. The results are shown in Table 3.

TABLE 3

|  | Example 3 | Example 6 |
|---|---|---|
| Temperature at which sample broke (° C.) | 40 | 80 |

Table 3 shows that the cross-linked composition obtained in Example 6 has a significantly improved resistance to heat deformation if compared to the same uncross-linked composition (Example 3).

The invention claimed is:

1. A process for preparing a flexible phase change material (PCM) composition having an amorphous polymer matrix comprising:
   a) from 50 to 70 wt % of one or more alkyl hydrocarbons; and
   b) from 30 to 50 wt % of at least one amorphous ethylene propylene rubber having a density equal to or lower than 0.900 g/cm³;
   the weight percentages of said alkyl hydrocarbons and said at least one ethylene propylene rubber being based on the total weight of the PCM composition, the process comprising the step of blending said one or more alkyl hydrocarbons and said at least one amorphous ethylene propylene rubber at a temperature above the melting point of the alkyl hydrocarbon and below 30° C. for a time sufficient to incorporate the total amount of the one or more alkyl hydrocarbons within the polymer matrix.

2. A process of claim 1 wherein at least one amorphous ethylene propylene rubber is grafted with 0.2 to 3 wt % of a carboxylic acid or carboxylic acid anhydride, the weight percentages being based on the total weight of the grafted amorphous ethylene propylene rubber.

3. A process of claim 1 wherein the process comprises blending the one or more alkyl hydrocarbons, the at least one amorphous ethylene propylene rubber, and additionally from 10 to 40 wt % of an inert powder consisting essentially of one or more flame retardant fillers having an absorption capacity of at least 50 wt %, the weight percentage absorption capacity being based on the dried mass of the inert powder, and the weight percentage inert powder being based on the total weight of the PCM composition.

4. A process of claim 3 wherein the inert powder has an absorption capacity of at least 120 wt %, the weight percentage absorption capacity being based on the dried mass of the inert powder.

5. A process of claim 3, wherein the one or more flame retardant fillers are selected from the group consisting of aluminum trihydrate, magnesium hydroxide, melamine pyrophosphate, melamine cyanurate, one or more brominated fillers and mixtures thereof.

6. A process of claim 1 wherein the process comprises blending the one or more alkyl hydrocarbons, the at least one amorphous ethylene propylene rubber, and additionally an additive selected from the group consisting of antioxidants and UV filters.

7. A process of claim 1 wherein at least one of the at least one amorphous ethylene propylene rubbers is crosslinked after incorporation of the alkyl hydrocarbon.

8. A process of claim 1 wherein the at least one amorphous ethylene propylene rubber is an EPDM rubber.

9. A process of claim 1 wherein the at least one amorphous ethylene propylene rubber is an EPM rubber.

10. A process of claim 1 wherein at least one amorphous ethylene propylene rubber is an ethylene propylene rubber grafted with 0.2 to 3 wt % of maleic anhydride, the weight percentages being based on the total weight of the grafted amorphous ethylene propylene rubber.

11. A process of claim 1 wherein the at least one amorphous ethylene propylene rubber is in the form of granules.

12. A process of claim 1 wherein the one or more alkyl hydrocarbons are paraffin waxes.

13. A process of claim 12 wherein the one or more alkyl hydrocarbons are selected from the group consisting of tetradecane, pentadecane and hexadecane.

* * * * *